July 28, 1925.

W. B. JOHNSON

HEADLIGHT

Filed May 26, 1924

WITNESSES

INVENTOR
W. B. Johnson,
BY
ATTORNEYS

July 28, 1925.  
W. B. JOHNSON  
HEADLIGHT  
Filed May 26, 1924
1,547,757
2 Sheets-Sheet 2
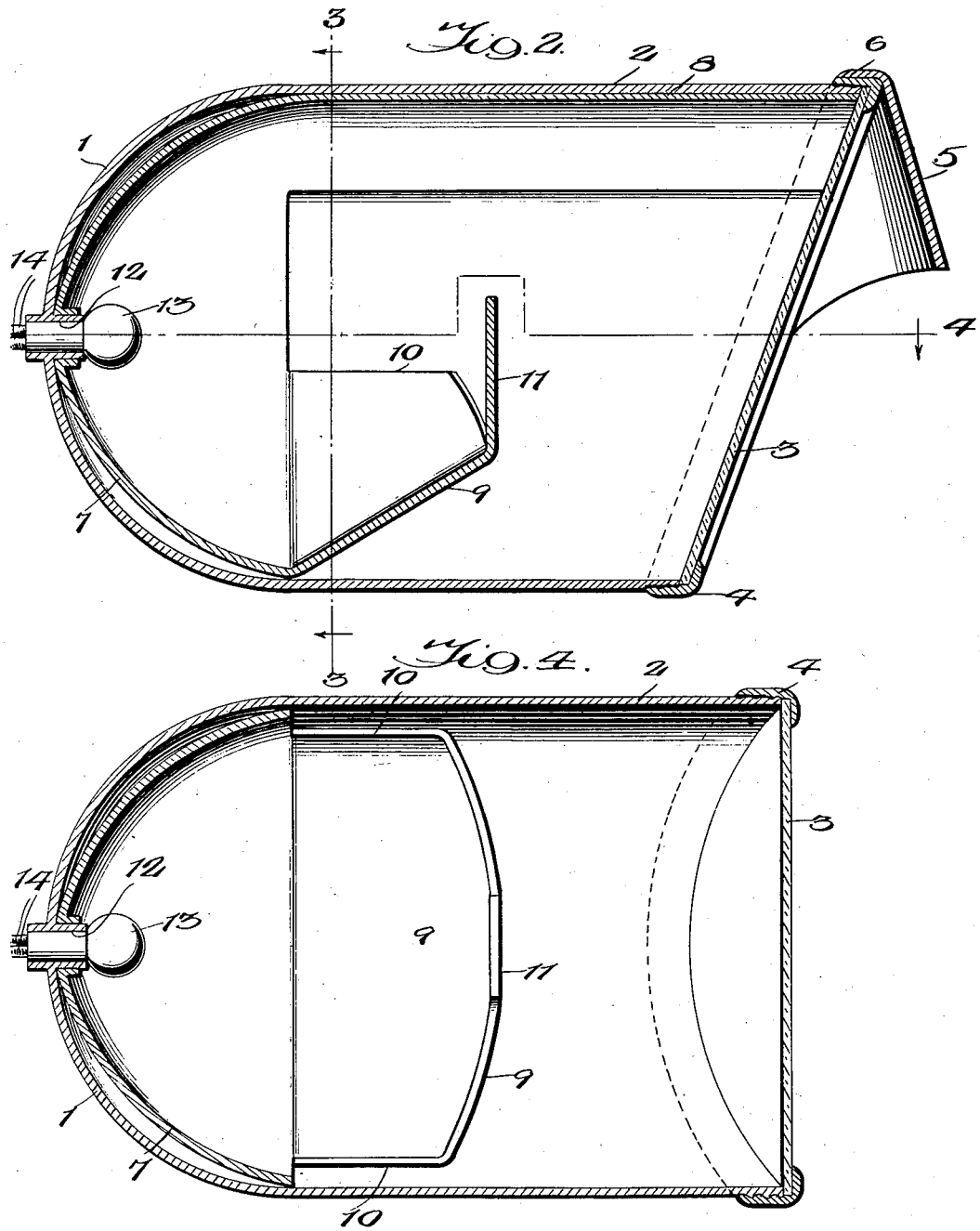

Patented July 28, 1925.

1,547,757

UNITED STATES PATENT OFFICE.

WILLIAM BLANTON JOHNSON, OF LEXINGTON, KENTUCKY.

HEADLIGHT.

Application filed May 26, 1924. Serial No. 715,979.

*To all whom it may concern:*

Be it known that I, WILLIAM B. JOHNSON, a citizen of the United States, and resident of Lexington, in the county of Fayette and State of Kentucky, have invented certain new and useful Improvements in Headlights, of which the following is a specification.

This invention relates to improvements in headlights for automobiles or other vehicles and it consists in the combinations, constructions and arrangements herein described and claimed.

An object of the present invention is to provide an improved headlight which is adapted to project rays of light from a source of light therewithin in a forward and downward direction, thus assuring the illumination of a roadway directly in front of the vehicle on which the headlight is supported without projecting glaring rays of light on approaching traffic.

A further object of the invention is to provide a headlight of the character described which is, adapted to diffuse rays of light projected therefrom in a forward and downward direction so that no upward reflection which might tend to cause glare on the eyes of persons approaching the vehicle provided with the headlights will result from the projection of rays of light from the headlights on the roadway in front of the vehicle.

Other objects and advantages will be apparent from the following description, considered in conjunction with the accompanying drawings, in which—

Figure 3 is a section along the line 3—3 of Figure 2,

Figure 4 is a section along the line 4—4 of Figure 2.

Figure 1:
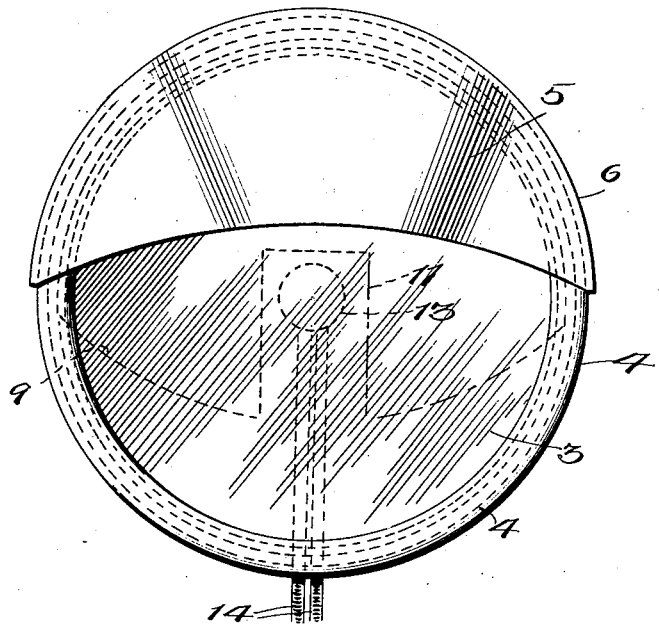
Figure 1 is a front view of a headlight embodying the invention.
Figure 2:
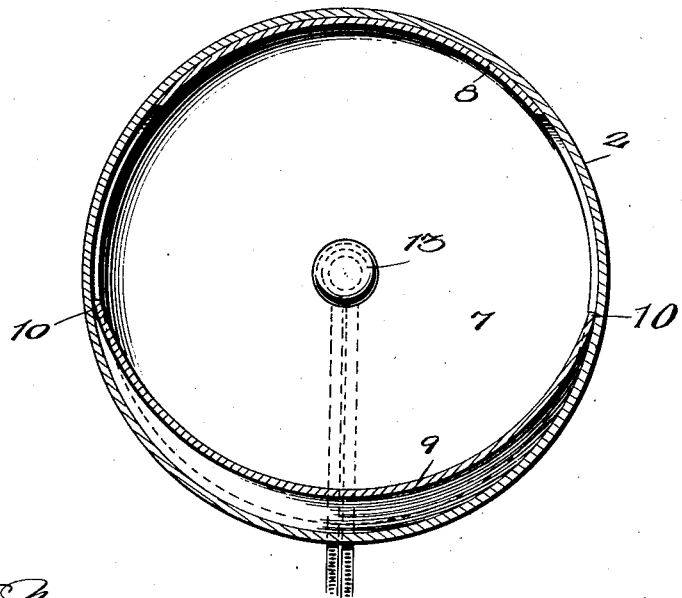
Figure 2 is a longitudinal vertical central section through the headlight.

A headlight embodying the invention comprises an outer casing having a substantially hemispherical rear end portion 1 formed with the walls thereof elongated in a forward direction to provide a substantially cylindrical extension 2 which is of relatively great length. The cylindrical and hemispherical portions of the casing are axially aligned with each other. The cylindrical extension 2 terminates at its forward end in a plane which extends obliquely to the axis of the casing, as best seen in Figure 2, the lowermost point on the cylindrical extension at the forward end of the latter being located rearwardly of the uppermost point of the cylindrical extension at the forward end of the latter. A lens 3 which is shown as being a circular glass plate is secured against the front end of the cylindrical extension 2 by a retaining ring 4 which is secured to the cylindrical extension in any suitable known manner. A hood 5 is provided with an arcuate attaching flange 6 at its rearward end which overlaps the upper portion of the ring 4 and is secured to the latter in any suitable known manner, as by means of rivets, not shown, or by welding. The body of the hood 5 is arcuate in cross sectional contour and is curved forwardly and downwardly from its juncture with the attaching flange 6 so that the inner wall of the body of the hood will overlie the space which is located directly at the front of the lower part of the cylindrical extension 2 and the hood decreases uniformly in cross sectional area from its lower end toward its upper end, the lower end of the hood being positioned slightly above the longitudinal median line of the outer casing.

The headlight includes an inner casing which comprises a rearward end portion 7 which conforms substantially to the shape of the corresponding portion of the outer casing and is disposed within the latter, being in contact with the inner wall of the outer casing at the juncture of the portions 1 and 2 of the outer casing. The portion 7 of the inner casing has the walls of the upper part thereof elongated to provide a forward extension 8 which is arcuate in cross sectional contour and therefore conforms to the curvature of the inner wall of the upper portion of the cylindrical portion 2 of the outer casing. The extension 8 has the outer wall thereof in close contact with the inner wall of the upper portion of the cylindrical portion 2 of the outer casing. The extension 8 terminates at its forward end flush with the corresponding portion of the cylindrical extension 2.

It will be observed that the extension 8 is located at the rear of the upper part of the hood 5 and that the lower edges of the extension 8 lie in a horizontal plane which intersects the outer casing at a considerable distance above the axial line of the latter.

The portion 7 of the inner casing has the walls of the lower portion thereof extended in a forward and upward direction to provide an inclined lower forward extension 9.

The lower forward extension 9 is arcuate in cross sectional contour as best seen in Figure 3 and terminates at its side edges in contact with the inner wall of the outer casing along horizontal lines indicated at 10 which lie in a horizontal plane located at a level lower than that of the longitudinal median line of the outer casing. A substantially vertical extension 11 upstanding from the forward end of the extension 9 intermediate the ends of the latter extends above the level of the longitudinal median line of the outer casing.

The outer and inner casings of the headlight may be secured together in any suitable known manner as by means of rivets not shown, solder or by friction between contiguous parts of the casings. A socket 12 is provided at the axial line of the rearward end portions of the inner and outer casings for the reception of an electric light bulb 13 which thus is positioned within the inner casing centrally of the rearward end portion thereof. Conductors as at 14 lead from the socket 12 through a central opening in the rear end portions of the casing and may be connected electrically with any suitable source of electric current supply.

From the foregoing description of the various parts of the device, the operation thereof may be readily understood. The inner walls of the portions 7, 11, 9 and 8 of the inner casing and the body portion 5 of the hood serve as reflecting surfaces. Since the extension 11 extends vertically above the level of the bulb 13, it will be manifest that the bright rays of light from the bulb 13 cannot pass horizontally forward from the headlight.

It thus will be manifest that the blinding of approaching traffic because of the projection of bright or glaring light rays in a straight forward direction is entirely obviated when a headlight embodying the present invention is employed. The rays of light from the bulb 13 will be reflected upwardly and forwardly by the lower portion of the reflector 7 and by the reflector 9 against the upper portion of the reflector 7, the reflector 8 and the reflector 5 and thence in a forward and downward direction upon the roadway in front of a vehicle on which the headlight is supported. The reflecting of rays of light from the bulb 13 upon the roadway in the manner just described causes the rays of light to be diffused and results in the thorough illumination of the roadway and space in front of the vehicle without causing any glare or upward reflection of light rays from the roadway.

All interior walls of the headlight which do not have reflecting surfaces as pointed out in the foregoing will be covered with a paint which has non-reflecting qualities.

If desired, the lens 3 may be colored in any suitable known manner or made of frosted glass or other suitable translucent material.

Obviously, my invention is susceptible of embodiment in forms other than that illustrated in the accompanying drawings and I therefore consider as my own all such modifications and adaptations as fairly fall within the scope of the appended claims.

I claim:—

1. A headlight comprising an elongated casing closed at one of its ends by an integral portion of the casing, a lens constituting a closure for the other end of the casing, a reflector having a body portion disposed within the first named end portion of the casing and being concavo-convex, the first named end portion of the reflector having a forward extension to its upper part and a separate forward extension to its lower part, the forward extension to its upper part terminating above the level of the longitudinal median line of the casing and the forward extension of the lower part of the body of said reflector being upwardly and forwardly inclined, means for supporting a light emitting element within said first named portion of the reflector centrally thereof, and a vertical shield carried at the forward end of the extension to the lower part of the body of the reflector, said shield being disposed directly in front of said light emitting element and comprising an upstanding extension at the front edge of the lower forward portion of the reflector midway of the width of the reflector.

2. A headlight comprising an elongated casing closed at one of its ends by an integral portion of the casing, a lens constituting a closure for the other end of the casing, a reflector having a body portion disposed within the first named end portion of the casing and being concavo-convex, the first named end portion of the reflector having a forward extension to its upper part and a separate forward extension to its lower part, the forward extension to its upper part terminating above the level of the longitudinal median line of the casing and the forward extension of the lower part of the body of said reflector being upwardly and forwardly inclined, means for supporting a light emitting element within said first named portion of the reflector centrally thereof, a vertical shield carried at the forward end of the extension to the lower part of the body of the reflector, said shield being disposed directly in front of said light emitting element and comprising an upstanding extension at the front edge of the lower forward portion of the reflector midway of the width of the reflector, and a hood carried by said casing, said hood being inclined downwardly from the upper part of the second named end of the casing and having the inner wall thereof adapted to serve as a reflector.

WILLIAM BLANTON JOHNSON.